United States Patent [19]

Okino et al.

[11] Patent Number: 4,675,738
[45] Date of Patent: Jun. 23, 1987

[54] IMAGE PICKUP DEVICE

[75] Inventors: Tadashi Okino; Nobuo Fukushima, both of Kanagawa, Japan

[73] Assignee: Canon Kabushiki Kaisha, Tokyo, Japan

[21] Appl. No.: 775,610

[22] Filed: Sep. 13, 1985

[30] Foreign Application Priority Data

Sep. 17, 1984 [JP] Japan .................................. 59-194144
Sep. 17, 1984 [JP] Japan .................................. 59-194145

[51] Int. Cl.⁴ ........................................... H04N 5/335
[52] U.S. Cl. ................................. 358/167; 358/213.16
[58] Field of Search ............... 358/209, 212, 213, 218, 358/221, 225, 227, 228, 163, 167; 250/214 C

[56] References Cited

U.S. PATENT DOCUMENTS 3,949,162  4/1976  Malueg .......................... 358/221 X
4,399,466  8/1983  Stephenson ........................ 358/228

FOREIGN PATENT DOCUMENTS 125718  11/1978  Japan ................................. 358/221
215865  12/1983  Japan ................................. 358/213

Primary Examiner—W. B. Perkey
Attorney, Agent, or Firm—Toren, McGeady & Associates

[57] ABSTRACT

An image pickup device in which electrical signals, representing an optical image from an image pickup element, are integrated during a first period and then the integrating operation is suspended for a prescribed time in which the output of the integrating circuit is read in a computer circuit. Thereby an otherwise necessary sample-and-hold circuit can be removed.

12 Claims, 33 Drawing Figures

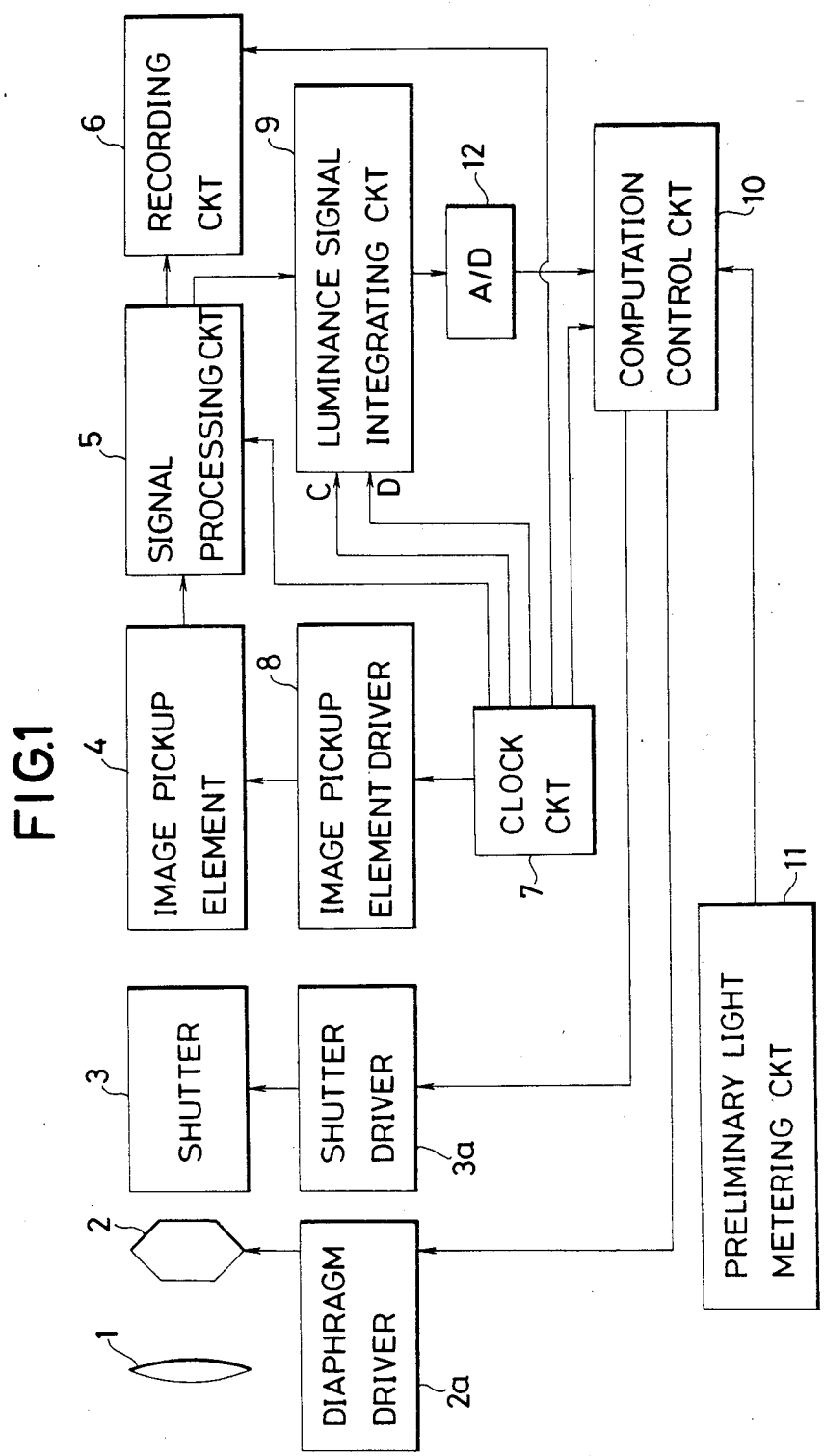

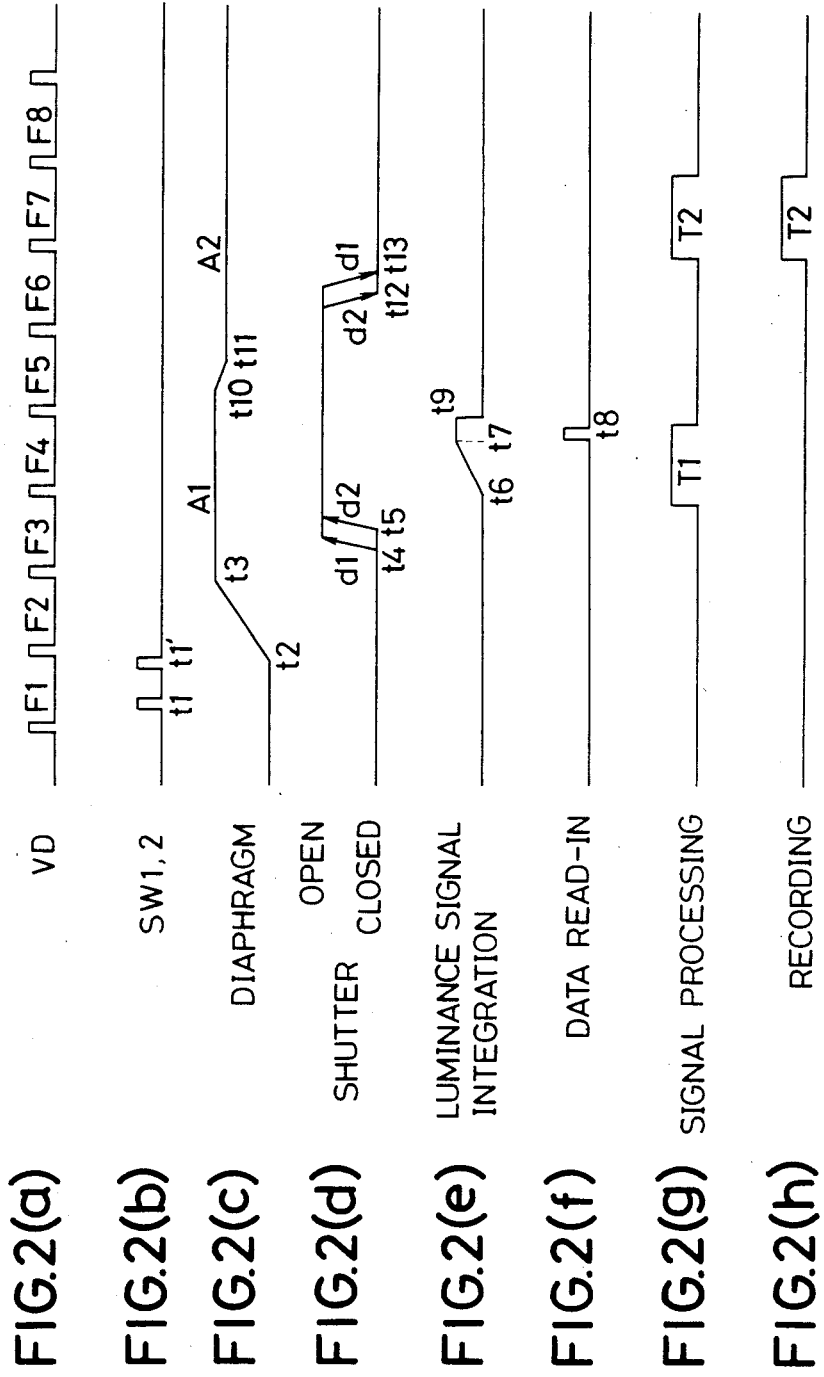

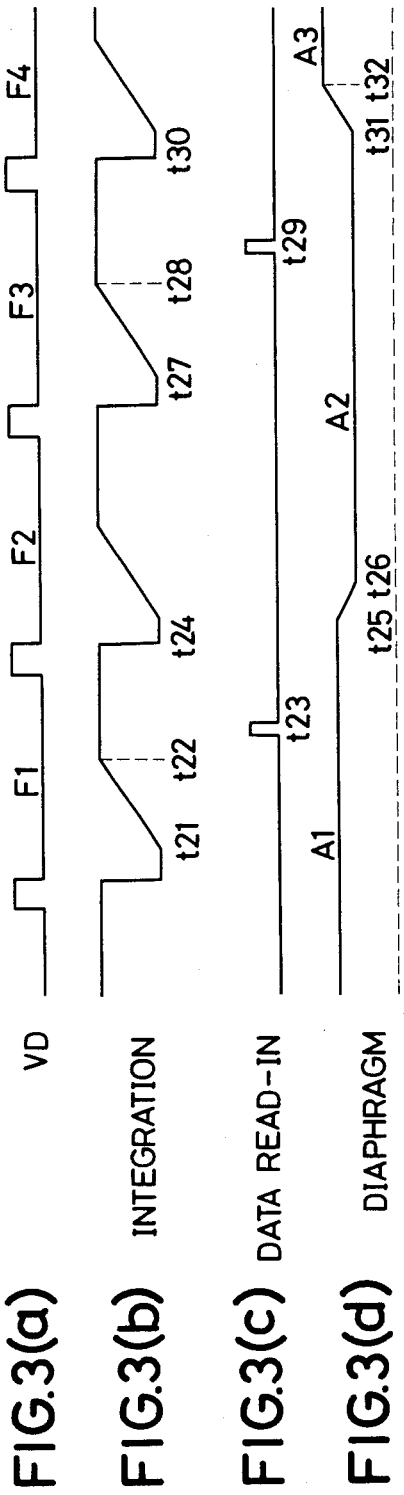

LUMINANCE
SIGNAL
INTEGRATION

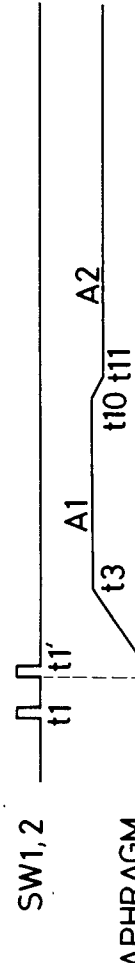
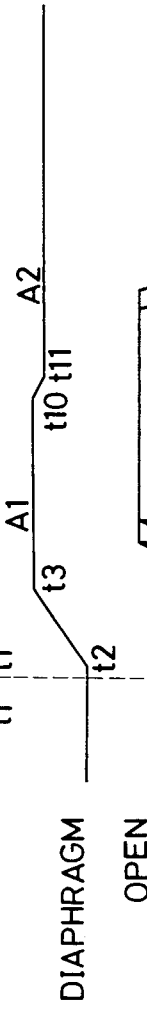
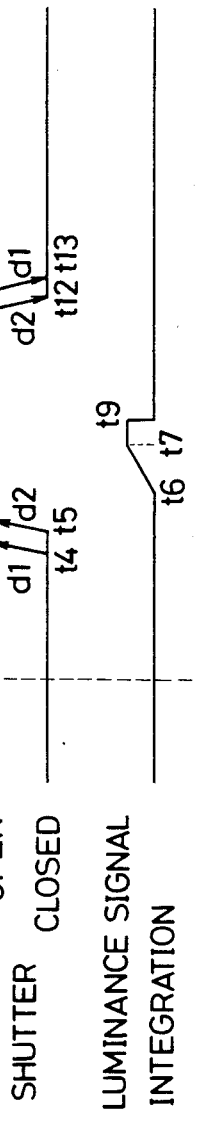
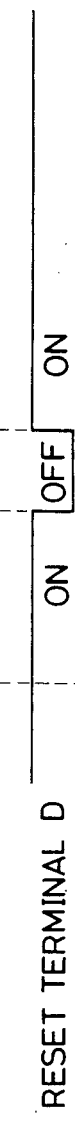

IMAGE PICKUP DEVICE

BACKGROUND OF THE INVENTION

1. Field of the Invention

This invention relates to image pickup devices, and more particularly to image pickup devices in which electrical signals from an image pickup element are used in controlling the exposure of the element to an optical image.

2. Description of the Prior Art

To control such exposure, a method may be considered that, as the image pickup device is being exposed to an image of an object, luminance signals are integrated for one image frame, then the output of the integrator, in digital form, is computed with other various informations, and then the exposure is so adjusted that the result of the computation is brought into coincidence with a reference value. With only such means, however, the information representing the integrated value of luminance signals for one image frame immediately vanishes when resetting occurs in the vertical blanking period. The prior known device of this kind, because of its use of a sample-and-hold circuit for storing that information, has, therefore, a problem that the electrical circuitry becomes complicated.

Since particularly the analog-to-digital conversion takes a considerably long time to perform, it is of importance to hold the integrated value for at least that period of time.

Another problem of the prior known device is that the reference for integration, despite the change of the level of signals due to change of temperature of the image pickup element, has to be maintained constant, and, therefore, the luminance signal, or its integrated value, is caused to change although the brightness of the object remains unchanged. Thus, the use of this integrated information results in a bad influence on the accuracy of exposure control.

SUMMARY OF THE INVENTION

An object of the present invention is to eliminate the above-described problems of the prior art, and to provide an image pickup device employing a novel timing method for reading in the integrated value of luminance signal for every one image frame with an advantage that the otherwise necessary sample-and-hold circuit as in the prior art is eliminated to reduce the structure of construction.

In an embodiment of the invention, the output of the image pickup element is integrated and then the integrating operation is stopped on the way, and, during this stopping period, the integrated value is read in, thereby it being possible to input the integrated information of the output of the image pickup means into computation means without the necessity of using the sample-and-hold circuit. Thus, a valuable reduction of the complexity of structure can be achieved.

Another object of the present invention is to provide an image pickup device with means making it possible to adjust the value of a reference for integration in accordance with the state of the image pickup device, thereby the change of the circuit conditions due to the change of the ambient temperature, for example, is cancelled to improve the accuracy of exposure control.

In another embodiment of the invention, the signal component of the output of the image pickup means, which is of black level, is subtracted from the integrated value of luminance signal to reduce the range of variation of the signal level ascribable to variation of the temperature of the image pickup element or the peripheral circuit. Therefore, the exposure can be controlled with high accuracy.

These and other objects, and features of the invention will become apparent from the following detailed description of embodiments thereof by reference to the accompanying drawings.

BRIEF DESCRIPTION OF THE DRAWINGS

FIG. 1 is a block diagram of a first embodiment of an image pickup device according to the present invention.

FIGS. 2(a) to 2(h) are pulse timing charts illustrating a manner in which the single frame exposure mode operates.

FIGS. 3(a) to 3(d) are pulse timing charts illustrating a manner in which the continuous-series-of-frames exposure mode operates.

FIGS. 6(a) to 6(j) are pulse timing charts illustrating a manner in which the circuit of FIG. 5 operates.

DETAILED DESCRIPTION OF THE PREFERRED EMBODIMENTS

Figure 4A:
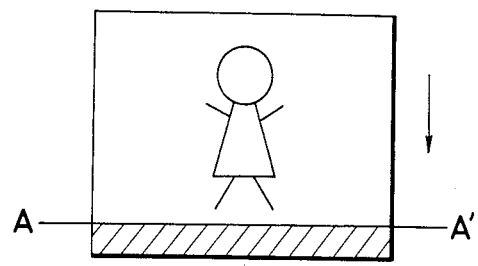
FIGS. 4(a) to 4(c) illustrate how the picture frame is partly scanned for inner integration.

The present invention will next be described in greater detail in connection with embodiments thereof by reference to the drawings.

1ST EMBODIMENT

An image pickup device of the invention, as shown in FIG. 1, has an optical system 1 for forming an image of an object on an image pickup element 4, such as CCD or like image pickup element, with the light passing through a diaphragm 2 and a shutter 3. The circuitry of the device comprises the image pickup element 4 for producing electrical signal representing the optical image, a signal processing circuit 5, a recording circuit 6, a clock circuit 7 for producing various timing signals, a driver 8 responsive to the signals from the clock circuit 7 for driving the image pickup element 4, an integrating circuit 9 for extracting a signal component which represents the level of brightness of the object out of the output of the signal processing circuit 5 and integrating it for every one frame, this integrating circuit 9 being in the form of a luminance signal integrating circuit, and a computation control circuit 10 receptive of another timing signal from the clock circuit 7 and the output of the luminance signal integrating circuit 9 for producing outputs which are applied to drivers 2a and 3a for the diaphragm 2 and shutter 3, respectively. Also, a preliminary light metering circuit 11, which operates independently of the integrating circuit 9 to roughly measure the object brightness, and an analog-to-digital converter 12 are provided.

The operation of such a device is described with reference to FIGS. 2(a) to 2(h) and FIGS. 3(a) to 3(d). Referring first to FIGS. 2(a) to 2(h), in the single frame exposure mode of the image pickup device, as the clock circuit 7 produces a vertical synchronizing signal VD by which successive fields are defined as F1, F2, F3, . . . , when a power switch (not shown) is closed at a time point t1, which assumed to be out of coincidence with the vertical synchronizing signal VD (FIG. 2(b)), the preliminary light metering circuit 11 produces an output representing a rough value of the object brightness which is applied to the computation control circuit 10. In sequence thereto, a release switch (not shown) is actuated at a time point t1' (FIG. 2(b)). Soon after that, from a time point t2 onward, the diaphragm driver 2a drives the diaphragm 2 to stop down to an aperture value depending on the preliminary light value in the form of the output of the computation control circuit 10 (FIG. 2(c)). The aperture adjusting operation is terminated at a time point t3. On assumption that this time point t3 falls within the field F2 and the aperture value is A1, it is in the next field F3 that the driver 3a drives the shutter 3 to be open for a time period depending on the preliminary light value in the form of another output of the computation control circuit 10 (from t4 to t5 in FIG. 2(d)). Whereas the shutter is of the focal plane type having two curtains d1 and d2, the leading curtain d1 has run down at a time point t4, and the trailing one runs down at a time point t5 to obtain an exposure time (t4−t5). This exposure time is determined based on the output of the preliminary light metering circuit 11 and the aperture value A1.

Figure 4B:
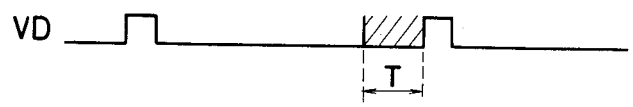
Figure 4C:
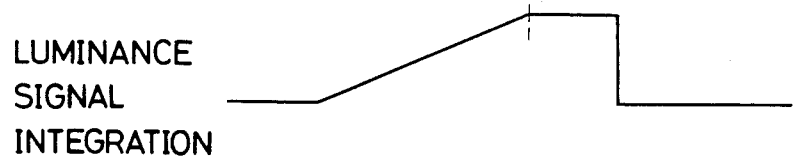

After the exposure, when in the next field F4, the electrical signals from the image pickup element 4 are processed by the signal processing circuit 5, and only a luminance signal from of the output of the signal processing circuit 5 is applied to the integrating circuit 9 in which the luminance signal is integrated during a first period from t6 to t7 in FIG. 2(e). Referring now to FIGS. 4(a) to 4(c), the picture frame is scanned vertically downward until a line A—A' during the first period. The vertical scanning from the line A—A' to the lower side of the picture frame takes a time period T (FIG. 4(b)) during which the integrating operation is stopped. In other words, the integrated value of the luminance signal for one picture frame is held for the time period T corresponding to a time period from t7 to t9 of FIG. 2(e).

For a fraction of the time period from t7 to t9 at t8, the output of the luminance signal integrating circuit 9 is converted to a digital signal by the A/D converter 12, and then read into the computation control circuit 10 (FIG. 2(f)). It is at this point of time where it is determined whether or not the exposure that was made with the roughly adjusted diaphragm 2 and shutter 3 and with inclusion of their tolerances, is proper by the computation control circuit 10. If there is a discrepancy, the setting of the diaphragm 2 is altered from the value A1 to a value A2 during a time period from t10 to t11 in the next field F5 (FIG. 2(c)). After the correction of setting of the diaphragm 2 to the value A2 has been completed, in the next field F6, the computation control circuit 10 again drives the shutter 3, through the shutter driver 3a, to expose the image pickup element 4 for a time period (t12−t13). This exposure time is determined by the aperture value A2 and the integrated value of luminance signal read in at the time t8.

Further, in the next field F7, the signal processing circuit 5 and recording circuit 6 are rendered operative to record the image pickup information on a recording medium (in a period T2 of FIGS. 2(g) and 2(h)).

Thus, the single frame shooting or recording is ended. Next, a movie shooting or recording will be explained by reference to FIGS. 3(a) to 3(d). It should be noted that in this case, if the shutter 3 can follow up the frame speed of motion picture, it may be allowed to operate, and if not, it may be kept open.

It is here assumed that, one field after another, the light metering and exposure operations alternate each other. FIG. 3(a) is a vertical synchronizing signal produced from the clock circuit 7, and, similarly to FIG. 2(a), this defines successive fields called F1, F2, . . . . Here too, as has been described in connection with FIG. 4(a), the lower marginal portion of the picture frame is excluded from the area to be integrated for luminance signal.

In the field F1, the luminance signal is integrated by the luminance signal integrating circuit 9 during a time period from a time point t21 to another time point t22 and then the integrated value of luminance signal for one frame is held during the remaining time period of the field F1, or a period from t22 to t24 (FIG. 3(b)).

Hence, at a time point t23 in the period from t22 to t24, the output of the luminance signal integrating circuit 9 is read into the computation control circuit 10 through the A/D converter 12 (FIG. 3(c)), and whether or not the value of luminance over the entire area of the frame (or the exposure value) is correct is examined within the field F1. If the exposure is determined to be out of coincidence with a reference, this discrepancy is corrected in the next field F2 by altering the aperture value from A1 to A2 in a time period from t25 to t26. In the next field F3, the same light metering operation as that in the field F1 is carried out. Then, in the next field F4, the correcting operation of the diaphragm 2 is recycled. Such alternate light metering and correcting operation is repeated subsequently.

As has been described above, according to this embodiment, by excluding a lower portion of the area of the picture frame from the integration of the luminance signal, the time ordinarily required for integrating that portion can be used for holding the integrated value of luminance signal for one frame in the luminance signal integrating circuit 9, and for converting the brightness information to a digital form, thereby giving an advantage that the sample-and-hold circuit of the prior art becomes unnecessary.

It should be noted that here the process is made in the order from top to bottom. However, when the direction of processing is reversed, that portion which is excluded from integration is an upper portion of the area of the picture frame. Of course, when a spot light metering mode is being carried out, it is near the end of scanning that the integrated value of the luminance signal, after the A/D conversion, is read in. It is also possible to apply various weights on the integration of the luminance signal. Since this can be performed by a known circuit, its explanation is omitted here.

Also, as for the timing of reading the output of the luminance signal integrating circuit 9 in the computation control circuit 10, if its timing pulse is formed by others within the holding period, it is of course possible to use it. To do so, a simplification of the circuit can be achieved. For example, the timing pulse for firing a flash device may be used for that purpose.

Also, according to this embodiment, without using a sample-and-hold circuit, the integrated value can be held for a considerably long period of time. This is suitable for subjecting the integrated value to A/D conversion. That is, there is no need for a high speed A/D converter. Therefore, the circuit becomes very simple.

It should be noted that in the embodiment, for the above-described purpose, the integration of the rear end portion of the area of the picture frame being scanned is stopped. But when a high speed A/D converter is in use, the entire area of the picture frame may be integrated. If so, the integration is stopped, for example, within the vertical blanking period, to carry out the A/D conversion and the reading of the data. Even in this case, there is the advantage of omitting the sample-and-hold circuit.

2ND EMBODIMENT

Next, FIG. 5 and FIGS. 6(a) to 6(j), respectively, illustrate an example of construction and arrangement of the elements of the luminance signal integrating circuit 9 for a second embodiment of the invention and a manner of operation of the same. It should be noted that the same reference characters in FIGS. 6(a) to 6(j) as those of FIGS. 2(a) to 2(h) are used to designate the same items.

Figure 5:
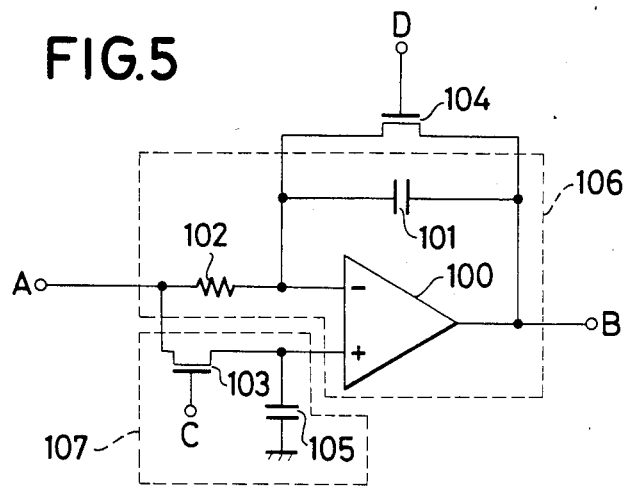
FIG. 5 is an electrical circuit diagram of the integrating circuit in a second embodiment of the invention.

In FIG. 5, an operational amplifier 100, an integration capacitor 101 and a resistor 102 are shown. These circuit elements 100–102 form an integrating circuit 106. 103 and 104 are respective switches. When high lever signals are applied to respective control terminals C and D of the switches 103 and 104, each switch conducts. When the control terminals C, D are at a low level, both switches 103 and 104 become non-conducting. A capacitor 105 is provided for storing a reference value for integration, while A and B denote input and output terminals of the integrating circuit 106, respectively. The switch element 103 and capacitor 105 constitute part of a sample-and-hold circuit 107 as reference level forming means. When the switch 104 is rendered conductive, the integration capacitor 101 discharges, thereby the integrating circuit 106 is reset. When the switch 104 is in its non-conducting state, signal integration operates. The switch 103 is rendered conductive in a prescribed time period during the time when the image pickup element 4 is producing output signals, allowing the capacitor 105 to be charged to a voltage corresponding to the reference level for integration. For the other time, the switch 103 is in its non-conducting state so that the capacitor 105 is maintained at the voltage of the reference level for integration. The foregoing is a constructional feature of the luminance signal integrating circuit shown in FIG. 5, and, in the following, its operation is described while referring to FIGS. 6(a) to 6(j).

The terminal D is high level in all fields except a field F4. Therefore, the luminance signal integrating circuit 9 is put in a resetting state except for the field F4 in which an integrating operation is performed (FIG. 6(i)). Also the image pickup element 4 is assumed to be a frame transfer type CCD. Then when the terminal C of FIG. 5 is changed to and maintained at a high level for a moment (time point t100) in the field F3 as shown in FIG. 6(j), because the electrical signals formed in the image pickup element 4 in the field F2 have been read out and applied to the input terminal A of FIG. 5, it is at the time point t100 that the corresponding output voltage of the image pickup element 4 to the field F2 is sampled through the switch 103 to the capacitor 105, and then held in that value. From FIG. 6(d), since in the field F2, the shutter 3 is closed, what is sampled and held at the time point t100 in the capacitor 105 is the output of the image pickup element 4 in the dark state, including informations such as dark current and noise of the image pickup element 4 just before an exposure.

Soon after the time point t100, the output of the luminance signal integrating circuit 9 is read in the computation control circuit 10 through the A/D converter 12 at a time point t101, which also falls in the field F3. At the time point t101, on the non-inverting input terminal of the operational amplifier 100, there is applied the corresponding output of the image pickup element 4, in the dark state, from the capacitor 105, while, because the switch 104 is in conducting state (FIG. 6(i)), the inverting input terminal thereof is short-circuited to the output terminal to allow translation of the voltage at the non-inverting input terminal to the output terminal B of the luminance signal integrating circuit 9. This output is once read in the computation control circuit 10 through the A/D converter 12.

In the next field F4, as the image pickup element 4 was exposed in the field F3, its output signal is, as has been described before, integrated by the luminance signal integrating circuit 9 (FIG. 6(e)) until a time point t7. At a time point t8 just next to it, also in the field F4, the output of the luminance signal integrating circuit 9 is again read in the computation control circuit 9 through the A/D converter 12 (FIG. 6(f)). After that, a difference between the values read in at the time points t101 and t8 is taken, representing an integrated value of luminance signal for one picture frame. Based on this value, a correction is applied for setting the diaphragm 2 to an aperture value A2 with which an exposure is to be made. The subsequent procedure is similar to that described in connection with the FIG. 2 embodiment.

As has been described above, when the luminance signal integrating operation is to be performed, the reference voltage is adjusted in accordance with the dark output of the image pickup element 4 obtained when the shutter 3 is closed. As compared with a reference voltage made invariable from a certain constant value, therefore, because the changes of temperature response characteristics (dark current, noise and the like) of the image pickup element 4, and moreover even other characteristics such as temperature drift of off-set of the signal processing circuit 5 and luminance signal integrating circuit 9, can be cancelled out, the error they give the measurement of the object brightness is minimized and the accuracy of exposure control can be increased.

3RD EMBODIMENT

Though, in the second embodiment, the shutter 3 is used for blacking out the image pickup element 4, the diaphragm 2 may instead be used for that purpose. If so, this case is applicable to a type of image pickup device in which, as both still and motion picture shootings are possible, when in the motion picture mode, the shutter is left open. In the third embodiment of the invention, therefore, before the start of an exposure, the diaphragm 2 is stopped down to a minimum size in such a timing as shown by a time point t102 in FIG. 6(j). With this, the reference for the luminance signal integrating circuit 9 is determined, thereby it being made possible even in the motion picture mode to control exposure without suffering from the variable factors of the image pickup element 4, signal processing circuit 5 and luminance signal integrating circuit 9.

4TH EMBODIMENT

If the system and the sequence of operations do not permit the diaphrgm and shutter to be used for darkening, a reference for integration of luminance signal may be taken when the horizontal transferring of the CCD is interrupted, that is, for example, at a time point t103 in FIG. 6(j). Thereby, though the image pickup element 4 itself is set aside from removing the changes of the characteristics, the variable factors of the peripheral circuitry to the image pickup element 4, such as the amplifier, the signal processing circuit 5 and the luminance signal integrating circuit 9 can be removed, increasing by far the accuracy of measurement of the object brightness, which leads to improve the accuracy of exposure control.

5TH EMBODIMENT

Figure 7A:
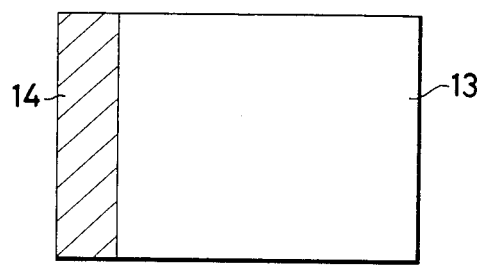
FIGS. 7(a) to 7(c) illustrate a fifth embodiment of the invention.
Figure 7B:
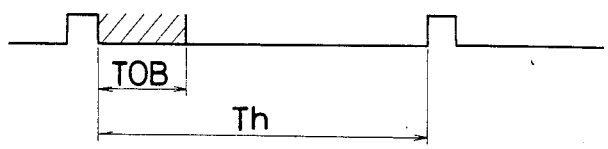
Figure 7C:

As shown in FIG. 7(a), when a left hand marginal portion of the area of the picture frame 13 indicated at 14 (a hatched area) is darkened, this corresponds to an early fraction $T_{OB}$ of a horizontal scanning period Th of FIG. 7(b). As shown in FIG. 7(c), it is at a time point tx in the time period $T_{OB}$ that the input of the luminance signal integrating circuit 9 corresponds to the dark level. If the reference value for the integrating circuit is read in the computation control circuit 10 at that time point tx, therefore, the changes of the characteristics of the image pickup element 4 to the luminance signal integrating circuit 9 can be cancelled.

6TH EMBODIMENT

Figure 8:
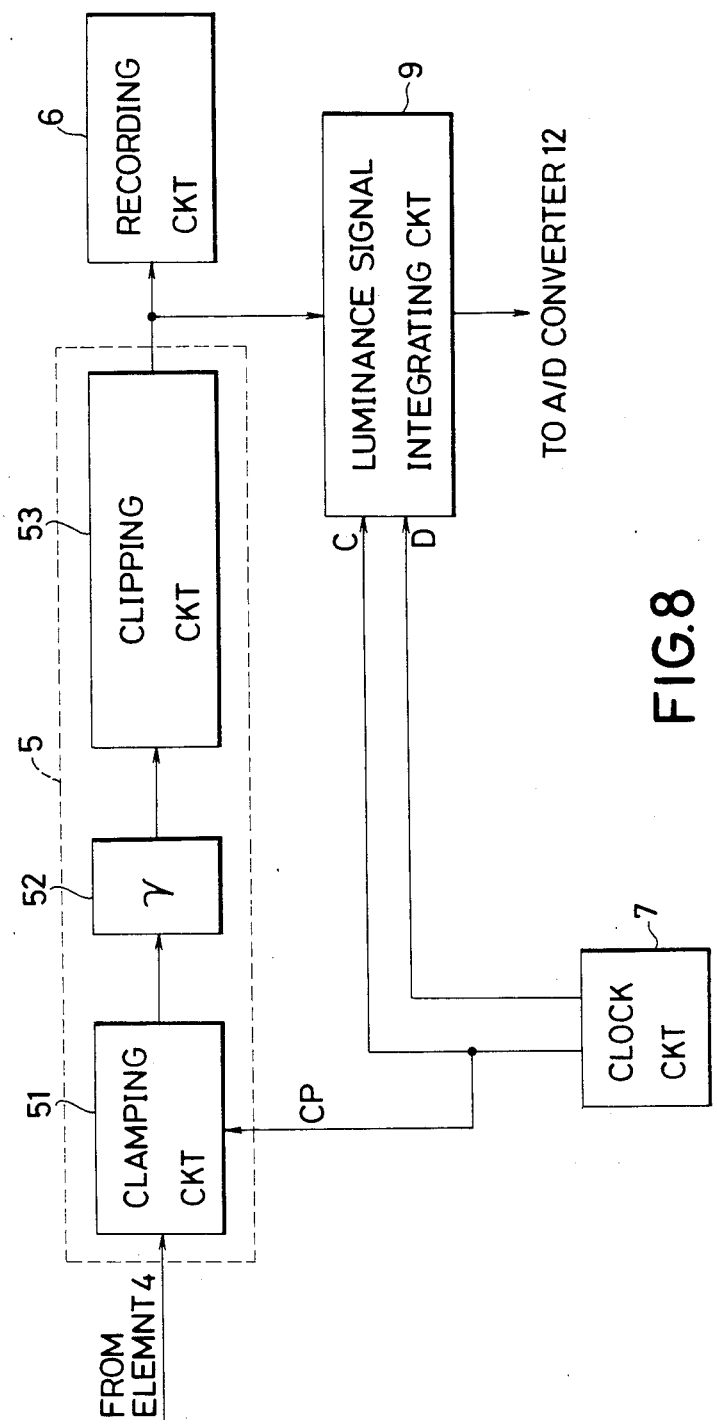
FIG. 8 is a block diagram of the main parts of a sixth embodiment of the image pickup device according to the invention.

Since this dark portion, called the "optical black spot", is usually often previously provided within the image pickup element for the purpose of forming the reference level for the clamping (DC restoring) circuit, this clamp level may be utilized as the reference level for the integration. That is, as shown in FIG. 8, the signal processing circuit 5 is made to include a clamping circuit 51 for clamping the signals from the image pickup element 4, a gamma correction circuit 52 for converting the clamped signal non-linearly, and a clipping circuit 53 for white-clipping and dark-clipping the gamma-corrected signal, and the clamping pulse CP, for causing the clamping, circuit 51 to perform clamping and the sampling pulse for application to the terminal C of the luminance signal integrating circuit 9, are made common, thereby the capacitor 105 is charged to the clamp level.

7TH EMBODIMENT

Figure 9:
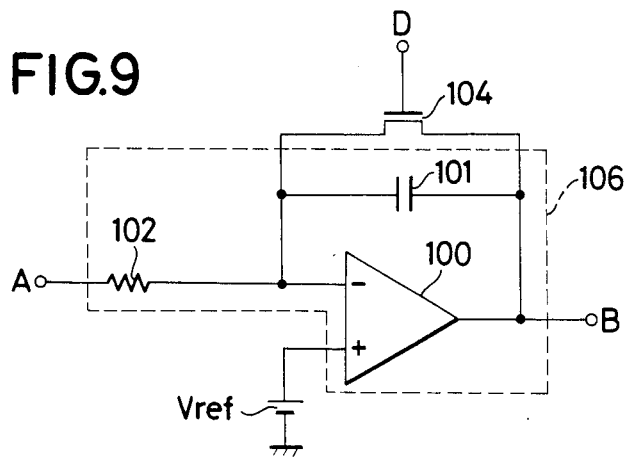
FIG. 9 is an electrical circuit diagram of the integrator in a seventh embodiment of the invention.

Otherwise, as shown in FIG. 9, the non-inverting input of the integrating circuit 106 may be used directly as the clamp potential Vref. With this, a simpler form than the fifth embodiment is realized while still permitting an equivalent result to be obtained.

8TH EMBODIMENT

Figure 10:
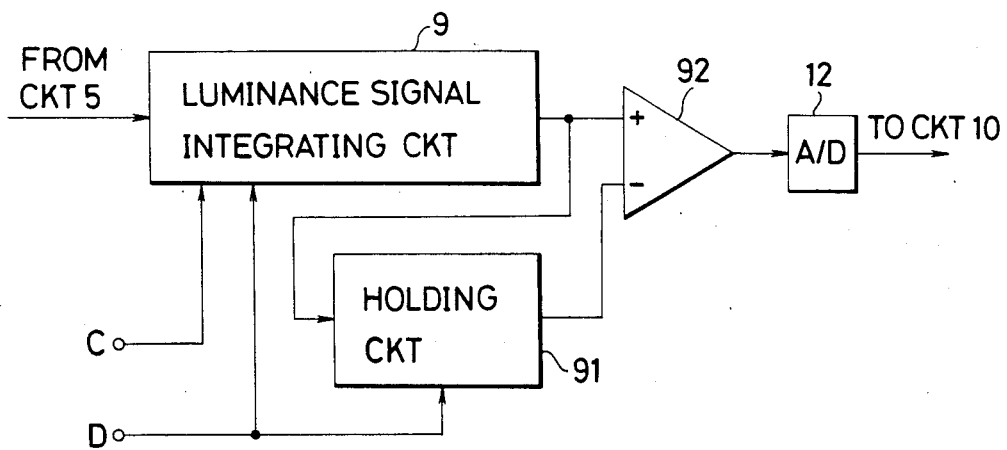
FIG. 10 is a block diagram of the main parts of an eighth embodiment of the invention.

Though, in the foregoing embodiments, the computation control circuit 10 is utilized to obtain the difference between the integrated video signal at the time point t8 and the signal of the dark image produced from the integrating circuit 106 at the time point t101, it is also possible, as shown in FIG. 10, to use a holding circuit 91, responsive to the pulse applied to the terminal D, for holding the signal at the time point t101, in combination with a difference amplifier 92 having two inputs connected to the outputs of the holding circuit 91 and the integrating circuit 9, respectively.

What is claimed is:
1. An image pickup device comprising:
   (a) image pickup means for converting an optical image to electrical signals;
   (b) reference level signal forming means for forming a reference level signal by using a prescribed output of said image pickup means;
   (c) integrating means for integrating an output of said image pickup means in accordance with said reference level signal formed by said reference level signal forming means; and
   (d) adjusting means for adjusting an output of said integrating means using a prescribed output of said integrating means.

2. An image pickup device according to claim 1, wherein said reference level signal forming means forms the reference level signal based on the electrical signals formed by said image pickup means when no light is incident on said image pickup means.

3. An image pickup device according to claim 1, wherein said reference level signal forming means forms the reference level signal based on a signal of an optical blank spot of said image pickup means.

4. An image pickup device according to claim 1, wherein said reference level signal forming means forms the reference level signal based on the output signal of said image pickup means for a period during which a driving of said image pickup means is suspended.

5. An image pickup device comprising:
   (a) image pickup means for converting an optical image to an electrical signal of a first period;
   (b) integrating means for integrating an output of said image pickup means for a second period shorter than said first period; and
   (c) computing means for reading out and computing an integrated information from said integrating means for the remaining period of said first period after completion of the integration operation in said integrating means.

6. An image pickup device according to claim 5, further comprising:
   means for controlling the operation of said image pickup means in accordance with an output of said computing means so that the output of said image pickup means takes a prescribed level.

7. An image pickup device according to claim 6, wherein said control means controls an amount of light incident on said image pickup means.

8. An image pickup device comprising:
   (a) image pickup means for converting an optical image to electrical signals;
   (b) integrating means for integrating an output of said image pickup means during a first period and stopping the integration operation for a prescribed period after the first period;
   (c) reference level forming meaans for forming an integration reference level for said integrating means by using a prescribed output of said image pickup means; and
   (d) computing means for reading an integrated information for said integrating means in the aforesaid stopping period to compute.

9. An image pickup device according to claim 8, wherein said reference level forming means forms the reference level signal based on the electrical signals formed by said image pickup means when no light is incident on said image pickup means.

10. An image pickup device according to claim 8, wherein said reference level forming means forms the reference level signal based on a signal of an optical black spot of said image pickup means.

11. An image pickup device according to claim 8, wherein said reference level forming means forms the reference level signal based on the output signal of said image pickup mens for the period while a driving of said image pickup means is topped.

12. An image pickup device comprising:

(a) image pickup means for converting an optical image to electric signals;
(b) reference level signal forming means for forming a reference level signal by using a prescribed output of said image pickup means;
(c) integrating means for integrating an output of said image pickup means in accordance with said reference level signal formed by said reference level signal forming means;
(d) holding means for holding an output of said integrating means for a period during which said reference level signal forming means forms said reference level signal; and
(e) difference forming means for taking a difference between an output of said integrating means and an output of said integrating means held by said holding means.

* * * * *